United States Patent
Wu et al.

(10) Patent No.: US 7,306,342 B2
(45) Date of Patent: Dec. 11, 2007

(54) NOTCH-FILTER REFLECTOR

(75) Inventors: Angus Wu, Corvallis, OR (US);
Anurag Gupta, Corvallis, OR (US);
Aruna Kumar, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 325 days.

(21) Appl. No.: 11/074,490

(22) Filed: Mar. 7, 2005

(65) Prior Publication Data

US 2005/0275937 A1 Dec. 15, 2005

Related U.S. Application Data

(63) Continuation-in-part of application No. 10/955,834, filed on Sep. 29, 2004, now abandoned, which is a continuation-in-part of application No. 10/867,956, filed on Jun. 14, 2004, now abandoned.

(51) Int. Cl.
*G03B 21/20* (2006.01)
*F21V 7/00* (2006.01)

(52) U.S. Cl. .................. 353/98; 353/122; 353/102; 362/341; 362/347

(58) Field of Classification Search ............... 348/742, 348/743, 748; 359/359–361, 887, 888, 891; 353/55, 56, 84, 85, 97, 122, 98, 102; 362/341, 362/343, 351, 347; G03B 21/20
See application file for complete search history.

(56) References Cited

U.S. PATENT DOCUMENTS

| | | | |
|---|---|---|---|
| 5,884,991 A | 3/1999 | Levis et al. | |
| 6,356,700 B1 | 3/2002 | Strobl | |
| 6,534,903 B1 * | 3/2003 | Spiro et al. | 313/113 |
| 7,178,950 B2 * | 2/2007 | Biber et al. | 362/345 |
| 2003/0117546 A1 * | 6/2003 | Conner et al. | 349/61 |
| 2004/0257537 A1 * | 12/2004 | Bierhuizen et al. | 353/31 |

FOREIGN PATENT DOCUMENTS

EP 1 324 114 A2 7/2003

\* cited by examiner

*Primary Examiner*—Andrew T Sever
(74) *Attorney, Agent, or Firm*—Timothy F. Myers

(57) ABSTRACT

A reflector includes a body that defines an optical surface. A reflective surface is disposed on the optical surface including a stack of dielectric layers defining at least one notch filter.

28 Claims, 12 Drawing Sheets

| Incident Angle (deg): | | 0 | | | | |
|---|---|---|---|---|---|---|
| | | Packing | Refractive | Extinction | Optical Thickness | Physical Thickness |
| Layer | Material | Density | Index | Coefficient | (FWOT) | (nm) |
| Medium | Air | | 1 | 0 | | |
| 1 | Ta2O5 | 1 | 2.14727 | 0 | 0.25 | 55.88 |
| 2 | SiO2 | 1 | 1.46352 | 0 | 0.25 | 81.99 |
| 3 | Ta2O5 | 1 | 2.14727 | 0 | 0.25 | 55.88 |
| 4 | SiO2 | 1 | 1.46352 | 0 | 0.25 | 81.99 |
| 5 | Ta2O5 | 1 | 2.14727 | 0 | 0.25 | 55.88 |
| 6 | SiO2 | 1 | 1.46352 | 0 | 0.25 | 81.99 |
| 7 | Ta2O5 | 1 | 2.14727 | 0 | 0.25 | 55.88 |
| 8 | SiO2 | 1 | 1.46352 | 0 | 0.25 | 81.99 |
| 9 | Ta2O5 | 1 | 2.14727 | 0 | 0.25 | 55.88 |
| 10 | SiO2 | 1 | 1.46352 | 0 | 0.25 | 81.99 |
| 11 | Ta2O5 | 1 | 2.14727 | 0 | 0.25 | 55.88 |
| 12 | SiO2 | 1 | 1.46352 | 0 | 0.25 | 81.99 |
| 13 | Ta2O5 | 1 | 2.14727 | 0 | 0.25 | 55.88 |
| 14 | SiO2 | 1 | 1.46352 | 0 | 0.25 | 81.99 |
| 15 | Ta2O5 | 1 | 2.14727 | 0 | 0.25 | 55.88 |
| 16 | SiO2 | 1 | 1.46352 | 0 | 0.3 | 98.39 |
| 17 | Ta2O5 | 1 | 2.14727 | 0 | 0.36 | 80.47 |
| 18 | SiO2 | 1 | 1.46352 | 0 | 0.36 | 118.07 |
| 19 | Ta2O5 | 1 | 2.14727 | 0 | 0.36 | 80.47 |
| 20 | SiO2 | 1 | 1.46352 | 0 | 0.36 | 118.07 |
| 21 | Ta2O5 | 1 | 2.14727 | 0 | 0.36 | 80.47 |
| 22 | SiO2 | 1 | 1.46352 | 0 | 0.36 | 118.07 |
| 23 | Ta2O5 | 1 | 2.14727 | 0 | 0.36 | 80.47 |
| 24 | SiO2 | 1 | 1.46352 | 0 | 0.36 | 118.07 |
| 25 | Ta2O5 | 1 | 2.14727 | 0 | 0.36 | 80.47 |
| 26 | SiO2 | 1 | 1.46352 | 0 | 0.36 | 118.07 |
| 27 | Ta2O5 | 1 | 2.14727 | 0 | 0.36 | 80.47 |
| 28 | SiO2 | 1 | 1.46352 | 0 | 0.36 | 118.07 |
| 29 | Ta2O5 | 1 | 2.14727 | 0 | 0.36 | 80.47 |
| 30 | SiO2 | 1 | 1.46352 | 0 | 0.36 | 118.07 |
| 31 | Ta2O5 | 1 | 2.14727 | 0 | 0.36 | 80.47 |
| Substrate | Glass | | 1.52283 | 0 | | |
| Total Thickness | | | | | 9.45 | 2589.73 |

Fig. 12

NOTCH-FILTER REFLECTOR

This application is a continuation-in-part of commonly assigned application Ser. No. 10/955,834, filed Sep. 29, 2004 now abandoned, which is hereby incorporated by reference, which is a continuation in a part of commonly assigned application Ser. No. 10/867,956 filed Jun. 14, 2004 now abandoned. This application is related to commonly assigned application Ser. No. 10/423,371, filed Apr. 23, 2003, which is hereby incorporated by reference.

BACKGROUND

A typical projection system includes an arc-lamp source of bright white light, a method for separating the white light into red, green and blue spectral components, and a spatial light modulator (SLM, also called a light valve) for two dimensional spatial imaging each of the spectral components over time to create a color picture. The SLM performs the spatial and temporal modulation in response to an analog or digital video signal generated by a computer or another video source such as a TV tuner, VCR, HDTV broadcast, or DVD player. The SLM typically creates sequential images in red, green, and blue color planes using a color wheel although other color separation techniques exist such as cyan, yellow, magenta, and optionally white planes. The color planes may then be recombined optically and projected onto a screen, or they may be flashed temporally in sequence onto the screen at such a rate that a viewer perceives only a single image.

Most digital projectors compete based on the number of screen lumens that the projector places on the projection screen. Although the competition in the projector market is fierce, cost considerations as well as size constraints have limited the development of more efficient light sources.

There are several problems with existing light sources used in digital projectors. Many arc lamp sources have a visible light spectrum that is non-uniform in irradiance. This non-uniformity requires that systems in which color wheels are used to have color wheels with specific coating designs to filter out portions of the non-uniform spectrum that are unwanted.

For instance, with a mercury-arc lamp, there are two intense spikes in the spectrum from 520 nm (nanometers) to 600 nm. One intense spike occurs from 520 nm to 560 nm. The other spike occurs from 560 nm to 600 nm. This last spike has a very intense yellow line spectrum that makes it difficult to achieve a good balance color gamut. Accordingly, this last spike is conventionally filtered out by the color wheel. By filtering out light in this spectrum, there is a loss of lumens reaching the spatial light modulator and ultimately the screen.

For example, the designs of conventional color wheel coatings are chosen to adjust the slopes and overlaps of the green and red filters on the color wheel to achieve good color balance. Typically, a red portion of the color wheel is designed to allow light to pass with wavelengths of 600 nm to 800 nm. Thus, the spike at 560-600 nm is essentially and substantially eliminated by the color wheel. Accordingly, there is a corresponding reduction in brightness generated by the projector.

In summary, there exists a need to overcome the efficiency, non-uniformity in spectral irradiance and other problems associated with arc lamp bulbs, particularly mercury vapor types.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

FIG. 12 is a table which illustrates one embodiment for a filter coating for a reflector to implement the exemplary spectral diagram shown in FIG. 11.

DETAILED DESCRIPTION

The following is a detailed description of the best presently known modes of carrying out the inventions. This description is not to be taken in a limiting sense, but is made merely for illustrating the general principles of the invention. It is noted that detailed discussions of projection systems components that are not pertinent to the present invention have been omitted for the sake of simplicity. The present invention is also applicable to a wide range of display technologies and presentation systems, including those presently being developed or yet to be developed. For example, although various exemplary projection systems are described below with reference to digital micro-mirror projectors, other types of spatial light modulators (SLMs) such as magnetorehological, diffractive, transmissive, interferometric, etc. are equally applicable to the present invention.

It should be noted that the drawings are not true to scale. Further, various parts of the optical elements have not been drawn to scale. Certain dimensions have been exaggerated in relation to other dimensions in order to provide a clearer illustration and understanding of the present invention.

In addition, although some of the embodiments illustrated herein are shown in two-dimensional views with various regions having length and width, it should be clearly understood that these regions are illustrations of only a cross-sectional portion of a device that is actually a three-dimensional structure. Accordingly, these regions will have three dimensions, including length, width, and depth, when fabricated as an actual device. Although, some three dimensional structures will be transverse rotations of the two dimensional structures shown, other three dimension structures having similar longitudinal cross-sectional portions exist, such as transverse rectangular shapes (e.g. extending the transverse cross-section linearly in depth or width dimensions), and are to be viewed as falling within the scope and spirit of the invention.

Further, although different embodiments are shown in cross-section along the longitudinal axis, different sections of the embodiment may have transverse cross-sectional profiles. The present embodiments illustrated are meant to cover the various possible transverse cross-sectional combinations possible and still remain within the scope and spirit of the invention.

Moreover, while the present invention is illustrated by embodiments directed to projector devices, it is not intended that these illustrations be a limitation on the scope or applicability of the present invention. It is not intended that the projector devices of the present invention be limited to the physical structures illustrated. These structures are included to demonstrate the utility and application of the present invention to presently preferred and alternative embodiments.

Figure 1:
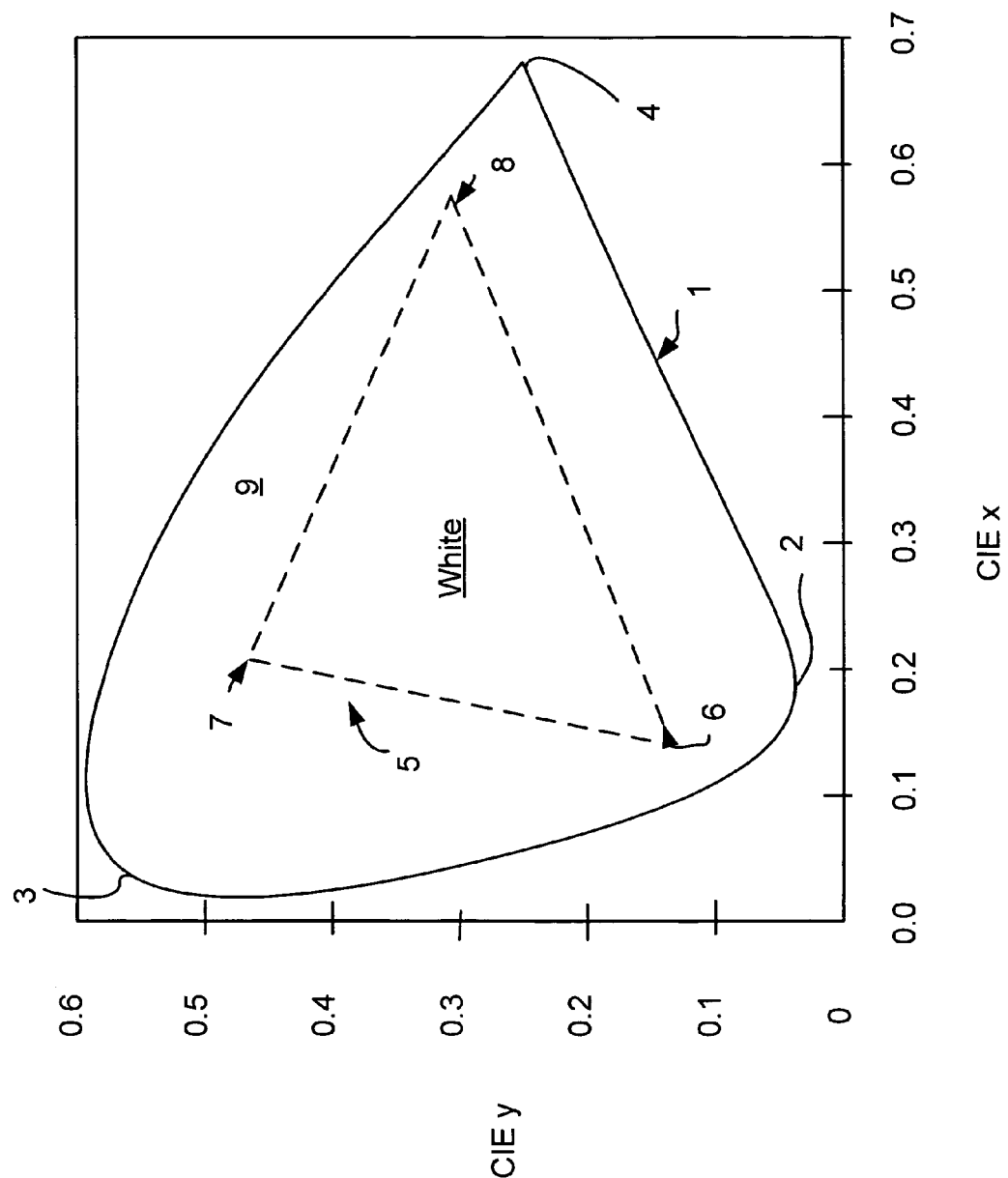
FIG. 1 is an exemplary chromaticity diagram illustrating an ideal and non-ideal gamut.

FIG. 1 is an exemplary 1931 CIE chromaticity diagram. A "gamut" is the range of colors that a projector is able to produce. An idealized projector with mono-chromatic primary blue, green red color projected pixels would have an idealized gamut 1. Thus, the idealized projector would be able to produce all colors within the approximately triangular area outlining gamut 1 with corners at the mono-chromatic blue, green and red primary colors 2-4, respectively. A non-ideal or realistic gamut for an exemplary real-life non-uniform light source includes colors within the approximately triangular area 5 with corners at the non-monochromatic blue, green and red color spectral bands 6-8, respectively. In the center is the white space. Also shown is the yellow spectrum 9. The addition of a strong yellow component can affect the resulting non-ideal gamut causing it to be smaller than desired.

Filtering out all but a very narrow range of colors centered about the monochromatic primary colors to create the monochromatic primaries would thus increase the gamut but would ultimately reduce the intensity of the projected image as light removed by the filtering would decrease the amount of lumens that could then be projected. Accordingly, a device for improving the gamut available from a given light source while maintaining brightness would be highly desirable.

Figure 2A:
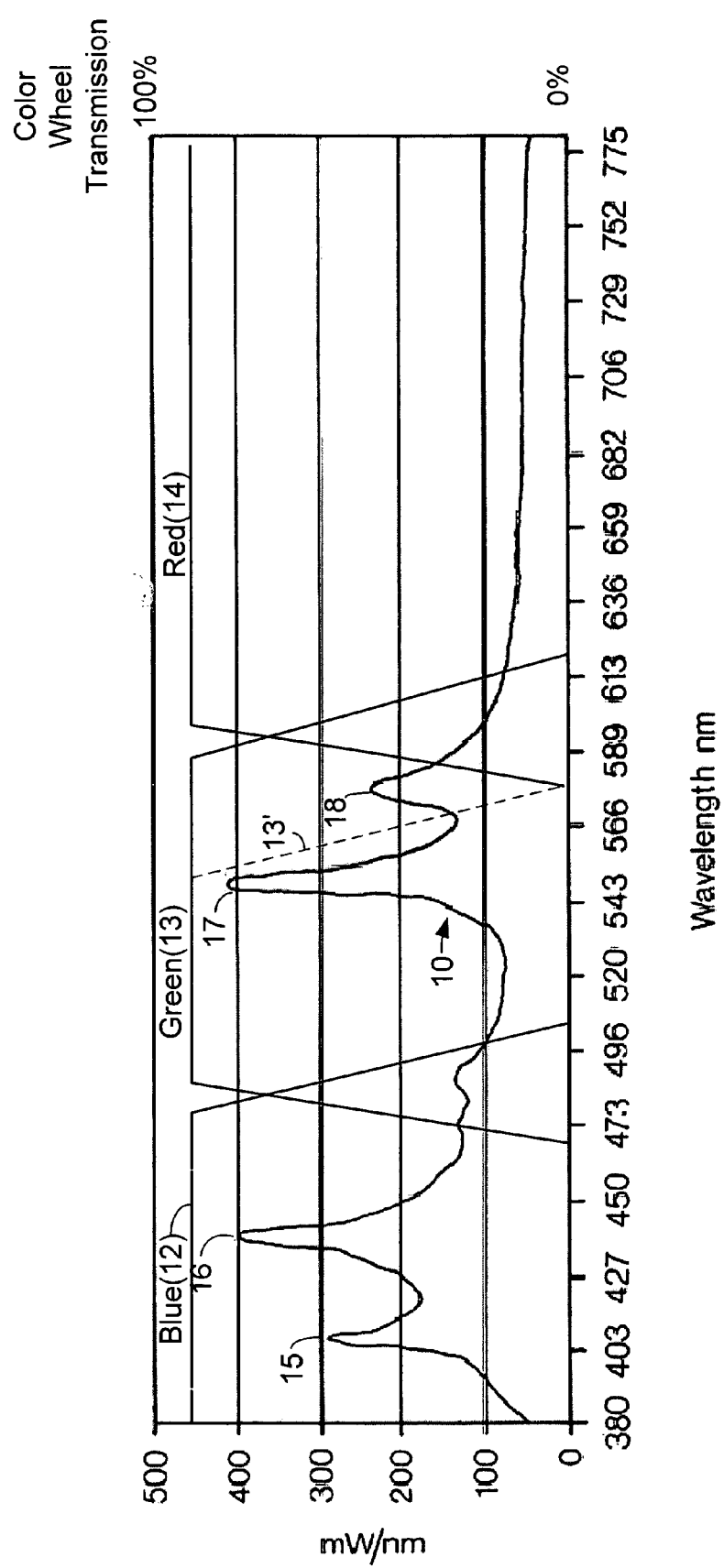
FIG. 2A is an exemplary graph of the relative spectral radiance of a mercury-arc lamp source in the visible wavelengths used in one embodiment of the invention and a conventional color wheel filter design.

FIG. 2A shows the spectral power distribution 10 of an exemplary mercury-arc lamp light source. The spectral power distribution 10 of the light source is non-uniform and includes energy in each of the plurality of color spectral bands 12, 13, 14 (respectively blue, green, red) used in a conventional color wheel. As shown, the spectral power distribution 10 is non-uniform within each of the color spectral bands 12-14. The spectral power distribution of the light source may include one or more spikes 15-18 in one or more color spectral bands 12-13 (blue, green) and may be deficient in at least one of the color spectral bands 14 (red).

First and second blue spikes 15-16 are located in the blue spectral band 12 at about 405 nm and 436 nm, respectively. Green spike 17 and yellow spike 18 are located in the green spectral band 13 at about 550 and 580 nm, respectively. The spectrum is generally deficient in the red color spectral band 14. The green spike 18 has a very strong intensity in the yellow line spectrum that traditionally has caused problems in balancing the true perceived color in digital projectors. Traditionally, manufacturers carefully design the band pass filters of the color wheel segments to eliminate (remove) this yellow spike 18 in a digital projector designs. For instance, the green segment is adjusted to move the right edge to that shown by adjusted green segment 13'. However, this traditional approach has reduced the amount of lumens available to the projection system by preventing the light from the yellow spike 18 from being projected.

Rather than eliminate the yellow spike 18, one aspect of the invention is to reduce the spike to approximately the lumen level of the immediate or adjacent neighboring wavelengths (thus making the light source more uniform in irradiance over wavelength) and to allow this reduced filtered portion of the light to pass to the rest of the projection system. This irradiance uniformity approach allows for balancing the gamut while preserving most of the lumens.

One method of achieving this result is to apply a notch-filter coating on a light source reflective surface to precisely reduce certain ranges or spikes of spectral energy within certain undesired color spectral bands to thereby increase the gamut. Because the spectral energy is only reduced and not eliminated, the color wheel can be modified from a traditional digital projector to allow this additional light to pass through to increase the amount of light projected. Accordingly, the spectral ranges from which energy is to be reduced are selected to improve the gamut while retaining desired brightness.

Figure 2B:
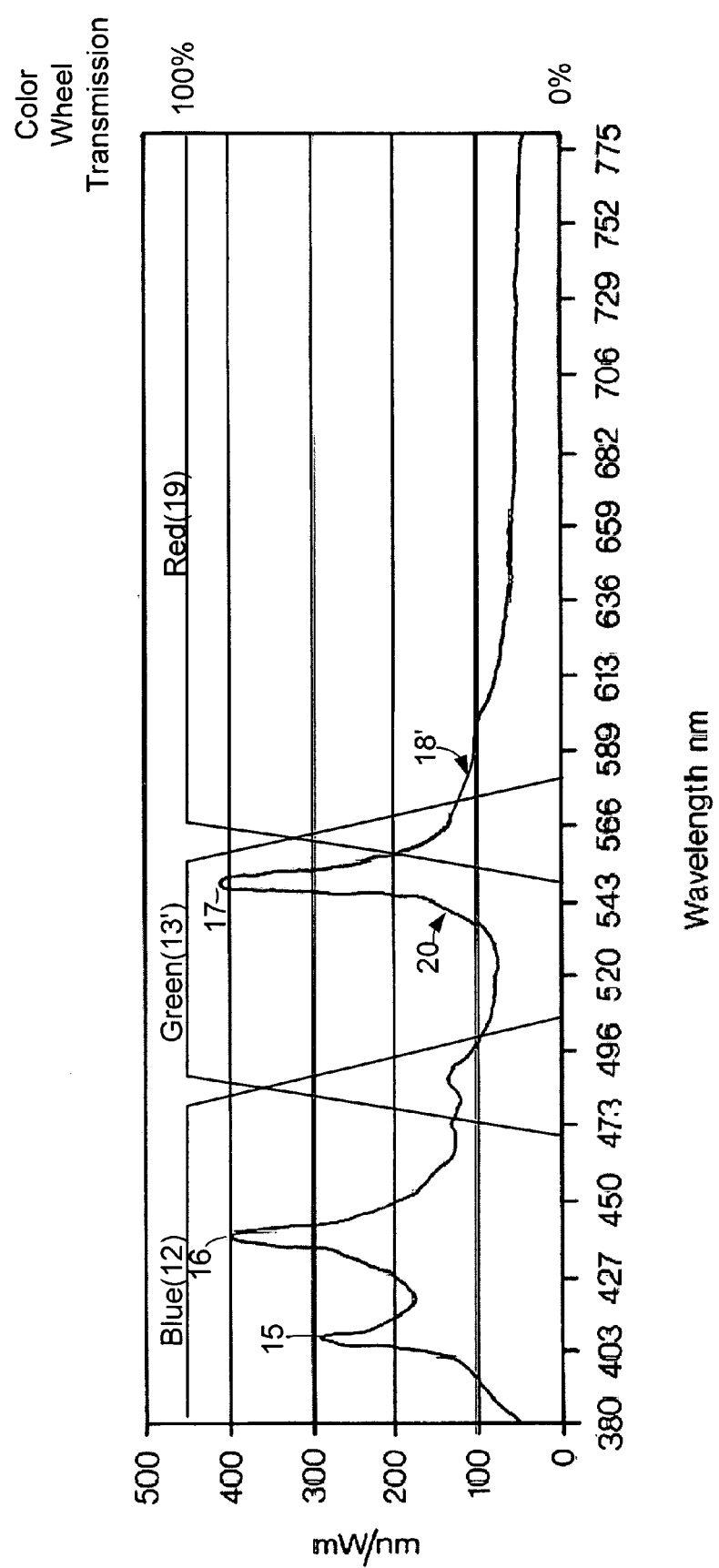
FIG. 2B is an exemplary graph of an of the relative spectral radiance of a light source having a notch-filter coating in one embodiment of the invention and a modified color wheel filter design used in embodiments of the invention.
Figure 10:
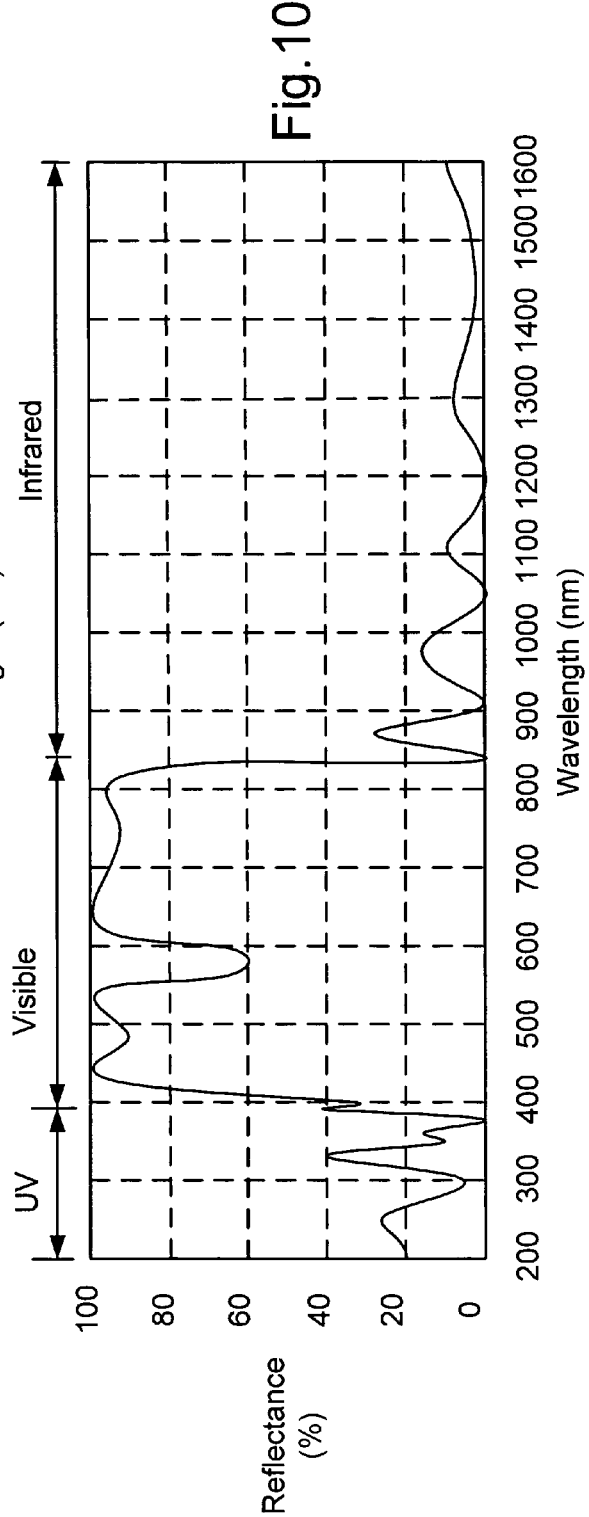
FIG. 10 is an exemplary spectral diagram of the reflector filter coatings showing a notch filter used in an embodiment of the invention.
Figure 11:
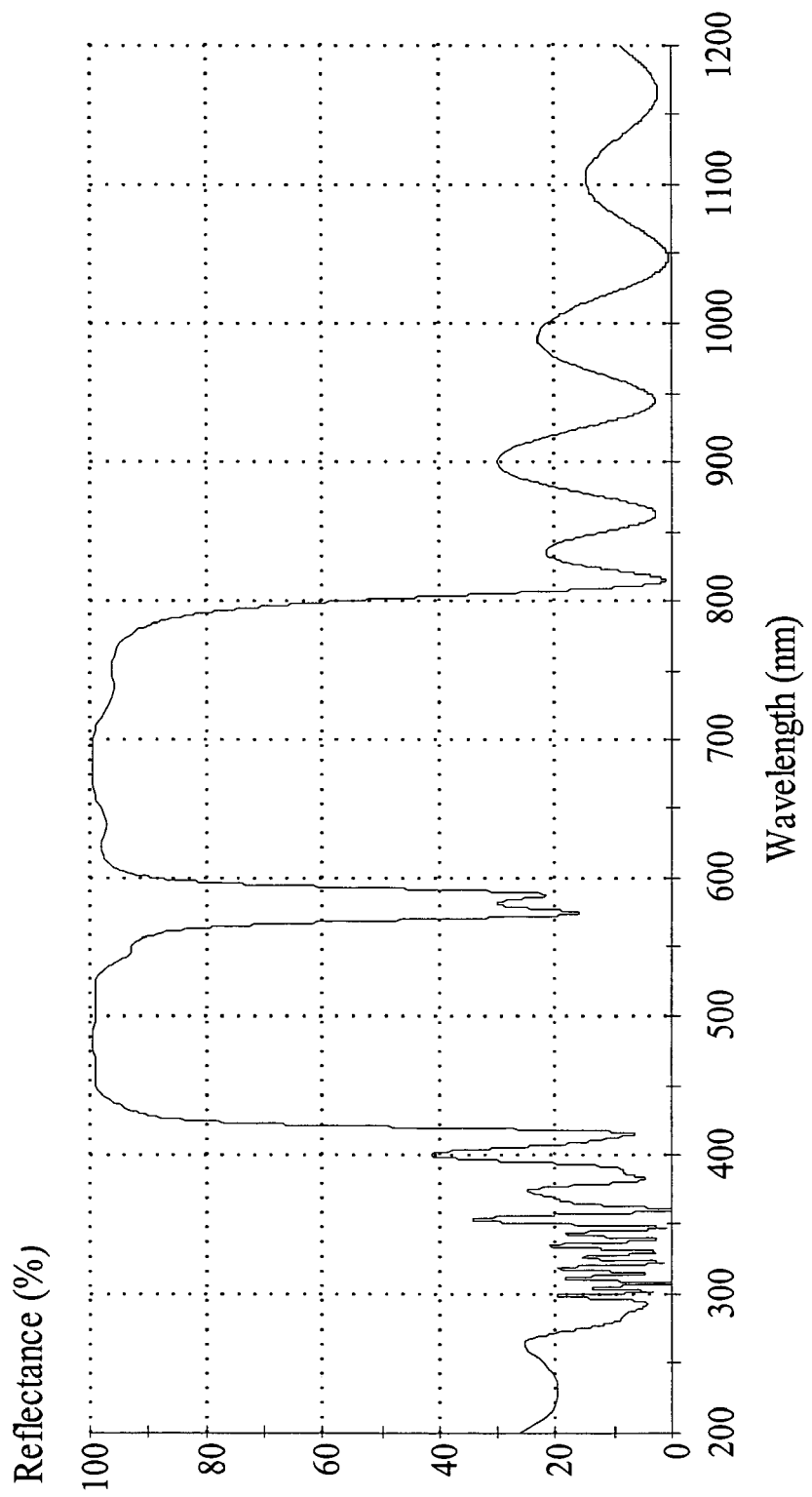
FIG. 11 is an exemplary spectral diagram of the reflector filter coating showing a stronger notch filter used in an embodiment of the invention.

A visible light notch-filter reflective coating with good rejection or low reflection in the notch is provided to reduce energy from the spectral power distribution of the light source to that of the immediate neighboring wavelengths (See FIGS. 2B, 10 and 11). A notch-filter will preferably have sharp spectral cut-on and cut-off regions. For an exemplary embodiment, the filter is preferably constructed with a reasonable number of layers of dielectric materials deposited on the reflector or other mirrored surfaces in the illumination path. The filter preferably has sharp spectral internal and external shoulders across the visual spectrum in two or more spectral bands.

For example, in one embodiment, a projector with a mercury-arc lamp light source may have a notch-filter coating on a reflective surface to reduce the yellow spike 18. The notch-filter coating may be an anti-reflection notch with a center wavelength at 580 nm and a bandwidth on each side of about 20 nm. The anti-reflection is preferably a reflection of less than or equal to 60% (for instance a 20% reflection) from 560 to 600 nm to achieve uniformity with the immediate adjacent wavelengths emitted by the mercury-arc lamp. The edge slope of the notch should be from 6 nm or less from the 90% to 10% anti-reflection points. The yellow notch-filter may be used, for example, at normal incidence with +/−10 degree angle of incidence cone and be optimized for about 5 degree angle of incidence. For an elliptical reflector, this corresponds to the 'Gupta illumination ring' area 311 of FIG. 3 (see commonly assigned application Ser.

No. 10/919,936, filed Aug. 17, 2004, and hereby incorporated by reference). The filter shift with angle of incidence is about 1.9 mm.

FIG. 2B shows the filtered spectral power distribution 20 of an ultra-high pressure mercury-arc lamp filtered by a yellow notch-filter coating on a reflective surface of the exemplary embodiment. Spectral energy is reduced in the yellow line spectrum of yellow spike 18 (see FIG. 2A) from 560 to 600 nm. Reducing lumen energy from the yellow spike 18 to that of the neighboring wavelengths improves the gamut while leaving much of the spectral energy associated with the yellow spike 18 retains desired brightness by allowing the remaining lumens to be collected by the modified red segment 19 of the color wheel.

There are several different methods to accomplish this notch-filtering. Accordingly, different embodiments of the invention are directed to notch-filter coated reflective assemblies that optionally include heat removal. The embodiments provide for making optical coatings on an transmissive (such as glass or quartz) or heat removal surface (such as aluminum or other metals) that reflect very efficiently in most bandwidth regions of visible light except while absorbing spectral energy within the bandwidth region of the notch-filter. In addition, the filter design may also absorb wavelengths outside of the visible spectrum to reduce unwanted non-visible emissions and allow for heat removal.

For instance in one embodiment, a reflector assembly for a projector includes a heat conductive assembly defining an electromagnetic (EM) chamber within a concave cavity, preferably parabolic or elliptic. An absorptive layer is disposed on the EM chamber to absorb a significant portion of the yellow spike in the 560 nm to 600 nm region and ultraviolet (UV) and infra-red (I/R) energy that is generated in the EM chamber by a light source. Various light sources include but are not limited to mercury-arc bulbs and Xenon-arc bulb light sources. In one embodiment, a dielectric is disposed on the absorptive layer, such as frit glass ($SiO_2$). The frit glass may be hand polished or otherwise finished to provide a smooth optical surface. In other embodiments, a molded or blown dielectric glass surface is used to form the EM chamber. A filter is disposed on the dielectric that allows multiple bands of frequencies to reflect (preferably in the visible light spectrum) while allowing other frequencies such as unwanted spikes, UV, and I/R to be absorbed or alternatively passed to an absorptive layer. The dielectric provides for isolation of the reflection filter from the absorptive layer and allows for ease of coating the filter over the absorptive layer. Further, the dielectric allows for smoothing out the surface of the absorptive layer such as by polishing. Depositing the dielectric in a highly compressed state and then later baking the dielectric to create micro-cracks relieves the internal stress while still maintaining good optical properties. The heat conductive assembly transfers the heat generated by the UV and I/R energy in the absorptive layer to the ambient environment. Optionally, a fan or other heat removal device is used to further dissipate the heat away form the reflector assembly.

In one embodiment of a reflector for a projector, a metal assembly is used to define a shaped surface for concentrating, directing, or otherwise focusing light from a light source. Such shaped surfaces include ellipsoid or parabolic surfaces although other hyperbolic or angled surfaces can be used. An UV and I/R absorptive filter layer is disposed on the shaped surface. A decoupling layer is disposed on the UV and I/R filter layer. The decoupling layer is transparent to UV and I/R energy and is of a sufficient thickness such that it is greater than the coherence length of the light source. A notch filtered reflective surface is disposed on the decoupling layer for reflecting visible light while passing through UV and I/R and reducing visible undesired peaks to the immediate surrounding wavelength levels. For instance, a mercury-arc lamp may have a coherence length of about one-half a micron. A decoupling layer having a thickness of greater than 1 micron provides sufficient non-interaction of the light between the reflective layers and the absorption layers.

More generally, embodiments of the invention can include any optical assembly that couples a light source adapted to create electromagnetic energy and a fixture for holding the light source that defines an optical cavity. A notch-filter for visible light is deposited on the optical cavity to reflect a range of visible light frequencies and further absorb or transmit electromagnetic energy within one or more narrow bands within the visible range and optionally bands outside the range of light frequencies. Optionally, a heat removal device integrated into the optical assembly dissipates the absorbed electromagnetic energy.

One method of using a heat-sink as an optical reflector is to define a cavity in the heat-sink to form an optical cavity. The cavity is then deposited, coated or otherwise formed with a material absorptive to at least one range of visible light. The absorptive material is then coated with a dielectric such as frit glass layer and preferably polished. The frit glass layer is then deposited, coated or otherwise formed with at least one layer of material that is reflective to a different ranges of visible light than that absorbed.

Another method of creating a filtered light source for an optical projector is to create a wide-band light source spanning from the infra-red (I/R) to the ultraviolet (UV). The I/R and UV light from the wide-band light source is filtered with dielectric coatings to create both a notch-filtered light output and a thermal radiant output. The thermal radiant output is transferred to a heat-sink forming an optical device that the dielectric coatings are disposed on to allow the optical device to project the notch-filtered light output.

While a reflector assembly for a projector is generally described, the invention can be used with any reflector device such as a spatial homogenizer (see 320, FIG. 3) or other mirrored surface. The reflector device includes a metal or glass reflector with the dielectric notch-filter coatings applied thereon.

For example, the dielectric coatings can be formed of several alternating layers of different thin film dielectrics, such as $Ta_2O_5$ and $SiO_2$. The different dielectrics have different refractive indexes and layer thicknesses depending on the desired notch-filter desired. One exemplary design to filter the yellow spike 18 in a mercury-arc lamp is shown in the table in FIG. 12 and its resultant reflectance spectrum in FIG. 11.

In one embodiment, the reflector has an absorptive coating applied. If a metal reflector, a glass layer is disposed on the absorptive coating. A selective optical reflector is disposed on the glass layer that allows at least one visible light spectrum region (via a notch-filter) to pass through to the absorptive coating. As such, the reflector then has a metal reflector defining an optical surface with an absorptive surface disposed on the optical surface and a glass layer disposed on the absorptive surface. The absorptive surface may also absorb light outside of the visible wavelengths. The glass layer can be any dielectric layer operating as a decoupling layer. A reflective layer to visible light and transmissive to non-visible light is disposed on the glass layer or other decoupling layer. Optionally the decoupling layer may be removed if the absorptive layer can be made of a material that can be finished smooth enough to form an optical surface and its complex refractive index does not lead to a complicated design and implementation of a high reflectance visible band-pass coating. Generally, the metal reflector has a coefficient of thermal expansion (CTE) substantially different from the CTE of the glass layer and the CTE of the absorptive layer if the absorptive black layer is non-metallic. Most deposition process are high energy processes resulting in coating deposition under highly compressed stresses. During thermal cycling the tensile stresses are relieved by the store compressive stresses in the coating structure. In case the tensile stresses exceed the stored compressive stresses the deposited coating will fracture to relieve the strain. However, the micro-fractures are not going to affect the system optical performance significantly. The absorptive surface may be fabricated to include one or more metal dielectric coatings in the absorptive layer selected for their absorption capabilities in a particular wavelength region.

The glass (or other decoupling) layer generally includes a thickness more than 1 micron to decouple the reflective surface from the absorptive surface. This thickness is generally greater than the coherence of the light source. Generally, the glass surface is polished to form a smooth optical surface for the reflective surface. Because the glass material may be deposited with high tensile stress, the optical assembly may be baked or otherwise heat cycled to allow the glass layer to have tensile stress fractures to relieve the stress during typical operation without affecting the optical properties of the glass layer. The reflective surface is created using one or more dielectric layers on the glass layer such as shown in FIG. 12. In some embodiments, the reflective surface may include of layers of $SiO_2$ and tantalum oxide (e.g. $Ta_2O_5$) or Titanium oxide (e.g. $TiO_2$).

The metal reflector may have a set of cooling fins or a heat pipe connected to the metal reflector to allow for the heat removal. Those of skill in the art know several other heat removal options. The optical cavity can optionally be sealed to ambient air or include openings to allow for additional heat flow depending on a desired thermal and optical design.

More detailed descriptions of how to make and use specific embodiments of the invention follow but are not meant to be limiting but only exemplary of the invention.

Figure 3:
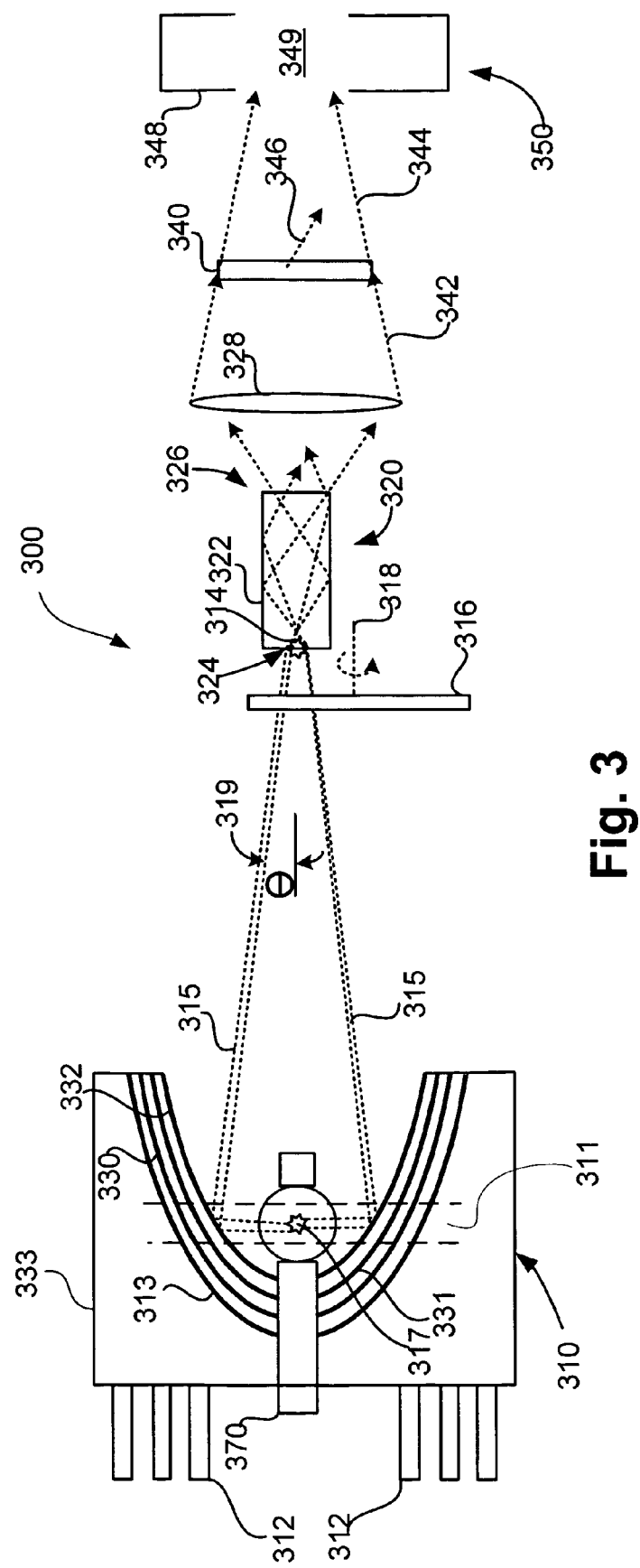
FIG. 3 is a schematic of an exemplary display system using at least one embodiment of the invention.

FIG. 3 is a schematic diagram of an unfolded optical display system 300 found in an exemplary projection device incorporating at least one aspect of the invention. The optical display system includes a light source 310, a color wheel 316, a spatial homogenizer 320, an spatial light modulator (SLM) 340, and imaging optics 350. The light source 310 includes an elliptical reflector 313 and a bulb 370. The bulb 370 is generally a mercury-vapor arc lamp that produces a small fireball 317 at a first focal point (object point) of the ellipse of broad band light that is imaged (focused) to a second focal point to create an image point 314 at the entrance 324 of the spatial homogenizer 320, shown as integrating rod 322.

The light source 310 creates a set of focused light rays 315 that converge to the image point 314 using a notch filtered reflective layer 332 (see FIGS. 10-11). The light source 310 generates electromagnetic energy in the UV and I/R wavelengths that are transmitted through a notch filtered reflection layer 332 and a decoupling layer 331 to be absorbed in absorptive layer 330. The light source 310 includes a metal reflector 333 that defines the elliptical reflector 313 on which the special coatings of the absorptive layer 330, the decoupling layer 331 and notch filtered reflective layer 332 are applied. The metal reflector 333 includes an integral heat removal device such as heat sink 312 that removes the energy absorbed by the absorptive layer 330.

The color wheel 316 is rotated about a color wheel axis 318 to present one or more color sections (such as red 19-green 13'-blue 12, red-green-blue-white, or red-green-blue-red-green-blue, to name a few) in order to convert the visible light spectrum from light source 310 to a temporal sequence of colors. Mercury lamps, however, are usually deficient in the amount of red spectrum produced, thus creating off-white light that must be corrected by the color wheel or other mechanism. The color wheel 316 is one of a number of gamut generators 456 (see FIG. 4) that can produce a sequence of colors. The spatial homogenizer 320 is used to create a spatially uniform intensity in the light rays emitted from the transverse cross-sectional profile at exit 326.

The focused light at the image point 314 enters the spatial homogenizer 320 at entry 324 at a first angle 319 (usually called a cone half-angle) based on the optical design of the elliptical mirror. Typically, a conventional integrating rod 322 used as spatial homogenizer 320 has a rectangular transverse cross-section profile (as opposed to the longitudinal cross-section shown) to convert the light into a rectangular image for focusing on a correspondingly ratioed rectangular shaped SLM 340. Most integrating rods 322 are constructed as hollow rectangular boxes and coated inside with a highly reflective coating to allowing incoming light rays to reflect off the surfaces. Optionally, additional notched visible, UV, and I/R filtering can be accomplished by coating the integrating rod with similar films as coated on the reflector 333 surface. This reflection with the integrating rod 322 spatially homogenizes the light thereby evenly distributing it over the transverse cross-sectional exit aperture to create a spatially uniform intensity in the cross-section of light rays leaving the exit 326 of the integrating rod 322. Generally, for conventional rectangular integrating rods 322, the light exits from exit 326 at first angle 319. The light rays leaving the integrating rod are then imaged into a set of uniform light rays 342 with a condensing lens 328 or other optics to fill the area occupied by the active elements of the SLM 340. This imaging is performed by having the height and width of the integrating rod 322 matched in ratio to the dimensions of the SLM 340. The reflected light 344 leaving the SLM 340 is then optically coupled into imaging optics 350 such that the reflected light 344 is substantially captured in the imaging optics aperture 349 of projection optics 348. Deflected light 346 is directed away from the imaging optics aperture 349 so it is not projected. Although the SLM 340 is described as reflective, the optical path is shown unfolded for ease of understanding.

There are several methods of manufacturing metal reflector 333 embodiments: One method is to form a rough hollow shape of the ellipse in a cylinder and then single point diamond turning (SPDT) the hollow shape within the cylinder. Another approach is to create two parts that are electroformed with a seam along the optical axis. Alternatively, the two parts can be electroformed as two parts with a seam perpendicular (transverse) to the optical (longitudinal) axis. In addition, various casting methods are known in the art and used for quality optical surfaces. More information about the manufacturing steps is detailed in FIG. 8.

While a conventional elliptical reflector is made from solid optical material such as glass, it is possible that the heat from the mercury-arc lamp if not properly controlled can cause the elliptical surface to deform and thus cause a drop in efficiency. Using a metal reflector 333 with an integrated heat removal device such as heat sinks 312 allows the reflector to maintain the elliptical surface over a wide range of operating temperatures such as a 100 deg C. transition. However, in some applications, the choice of reflector material may not be affected by the energy of the lamp, such as in low intensity applications. However, the coatings describe herein can still be applied to the elliptical or other hyperbolic surface (such a parabolic) and still perform a filtering function.

Figure 4:
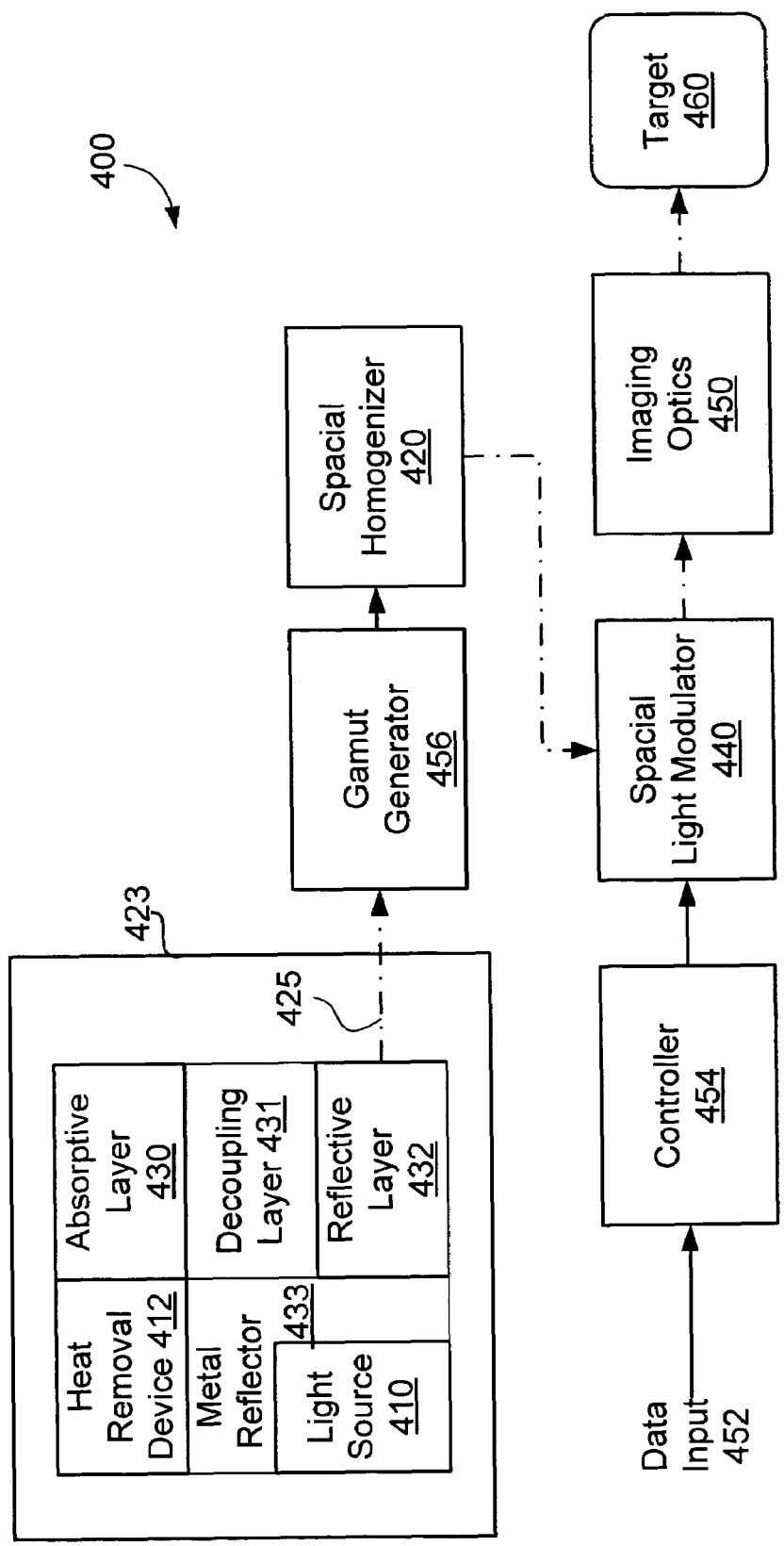
FIG. 4 is an exemplary block diagram of a projection system that includes an embodiment of the invention.

FIG. 4 is a more general block diagram 400 of an embodiment of an optical imaging system that incorporates the invention. The light path through the optical system is illustrated with dot-dash lines. Other signals are shown as solid lines. A light generator 423 includes a light source 410, a metal reflector 433 with an absorptive layer 430, decoupling layer 431 and a notch filtered reflective layer 432 to create a band-pass with at least one notch filtered light 425 and transmits it to a gamut generator 456 (for creating color). The light source 410 preferably includes an imaging surface that concentrates the light using a concave surface such a elliptical or parabolic.

The filtered light 425 from the light generator 423 is optically coupled to the spatial light modulator 440. A controller 454 that receives analog or digital input from a video or picture source data input 452 controls the SLM 440. The light from the SLM 440 is then optically coupled to the imaging optics 450 for projection or imaging on a target 460. Such targets 460 include a front or rear projection screen, a wall, a translucent screen, or other display device, such as an active screen. An active screen allows for optical amplification or contrast enhancement of the image projected on it. In addition, the gamut generator 456 can be incorporated after the spatial light modulator 440, the imaging optics 450 or even incorporated into the target 460, such as with an active screen.

Figure 5:
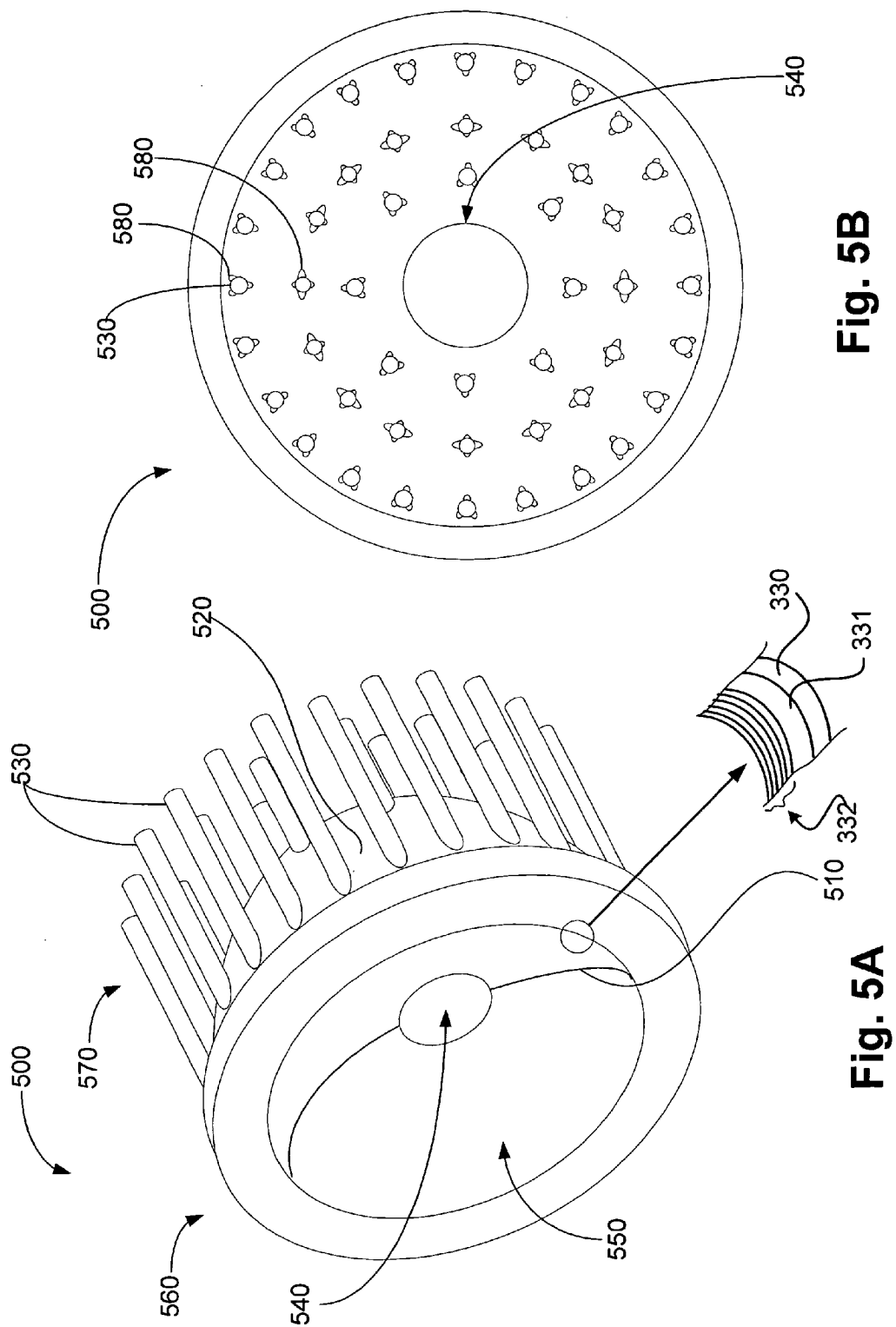
FIGS. 5A-5B are perspective and rear views, respectively, of one exemplary embodiment of a light source reflector that can include an embodiment of the invention.

FIGS. 5A-5B are perspective and rear views respectively of an exemplary embodiment of just one of the possible reflector assemblies 333, 433 (FIGS. 3-4) that create filtered light. FIG. 5A is an elliptical light reflector 500 with a bulb opening 540 and a partial elliptical reflector cavity 550. The shape of the partial elliptical reflector 513 is such that light from a first focal point of the ellipse, such as at the location of fireball 317 (FIG. 3), is reflected from reflective surface 510 and forms an image point 314 at the second focal point of the ellipse. The reflector surface 510 is made up of absorptive layer 330, decoupling layer 331, and notch filtered reflection layers 332, a stack of multiple dielectric coatings.

FIG. 5B is a rear view of the proximal end 570 of FIG. 5A illustrating the cooling fins 530 that are radially distributed to allow for airflow from an air moving device such as a fan or blower to flow across them and remove heat into the ambient environment. Also shown are turbulence inducing features 580 which are formed on the cooling fins 530 to maximize the turbulence of the airflow as it passes over the cooling fins 530. Maximizing the amount of heat transferred from the reflector body reduces heat build-up in the cavity 550 thereby increasing the life of the lamp assembly as well as allowing the reflector shape to be maintained and efficiently couple light into the spatial homogenizer 320. The opening 540 allows for placement of a fixed or replaceable bulb assembly.

Figure 6:
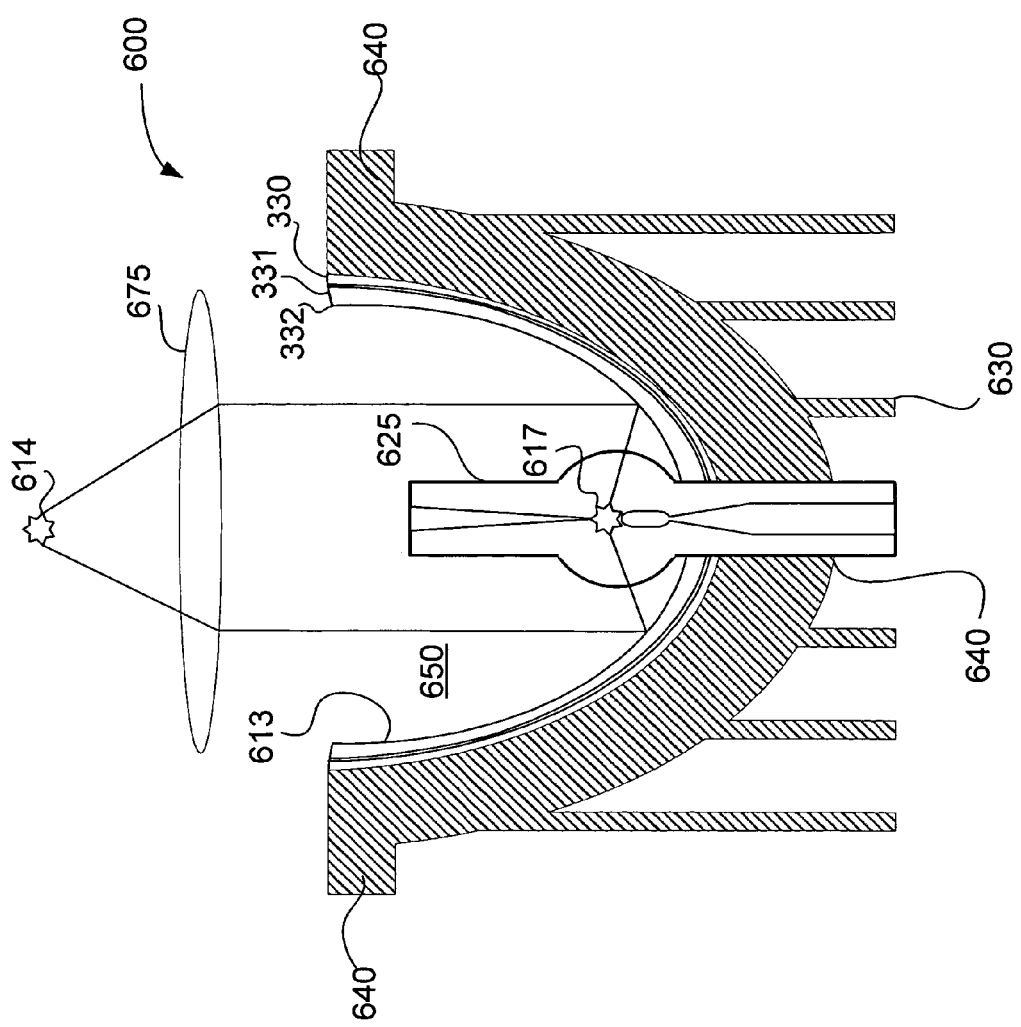
FIG. 6 is an cross-section of an exemplary alternative light source reflector assembly that includes at least one embodiment of the invention.

FIG. 6. is cross-sectional view of an alternative light source 600. In this view, a parabolic light source has a bulb 625 in opening 640 that forms a fireball 617 at a focus of a parabola 613 in cavity 650. The visible light leaving the focus of the parabola is reflected off the notch filtered reflected surface 332 to create a substantially collimated (parallel) light path that is then imaged to an image point 614 by a condensing lens 675. The undesired visible peaks and V, and I/R radiation are transmitted through the notch filtered reflective layer 332 through the decoupling layer 331 and is absorbed by the absorptive layer 330. The energy absorbed is converted to heat by the absorptive layer and dissipated into the reflective body 640 and ultimately dissipated by the integral cooling fins 630. This approach allows for more flexibility in designing the length of the light path (and hence the half-angle) because the optics of condensing lens 675 forms the image point 614, thus the reflector can be made with less tolerance. This approach is generally less efficient that the elliptical mirror approach and adds an additional element, thus increasing the weight, length, and cost of the light source. However, because the filtered light leaving the reflective surface 332 is substantially only in the visible spectrum a lower cost condensing lens 675 can be used as there is no need for UV and/or I/R filtering in the rest of the light path.

A conventional projector design is generally limited to a single light source having a well-defined fireball imaged to a particular image point. However, a projection or other imaging system using the invention can allow for different types of light sources other than conventional mercury-arc lamps. Mercury is a known toxic material and it is generally desired to reduce or eliminate its use. For instance, light sources such Xenon have longer operating lives and are whiter than mercury bulbs but may not have as much light output for a given wattage and generally do not form as small a point source. Further, there is more light in the I/R region which must be removed otherwise it will degrade other optical components in a projector. By incorporating the filter coatings onto a metal reflector with heat removal and imaging the Xenon fireball at an image point in front of the entry aperture of the spatial homogenizer 320, the efficiency of the Xenon light source is improved, thus allowing for a mercury-free light source solution. Thus, the bulb in any of the embodiments may be replaced with a non-mercury light source such as Xenon, Sodium, or Halogen based lights to just name a few. In fact, several different light sources that are non-point sources may be used depending on the application and the spatial light modulators and gamut generators chosen.

Figure 7:
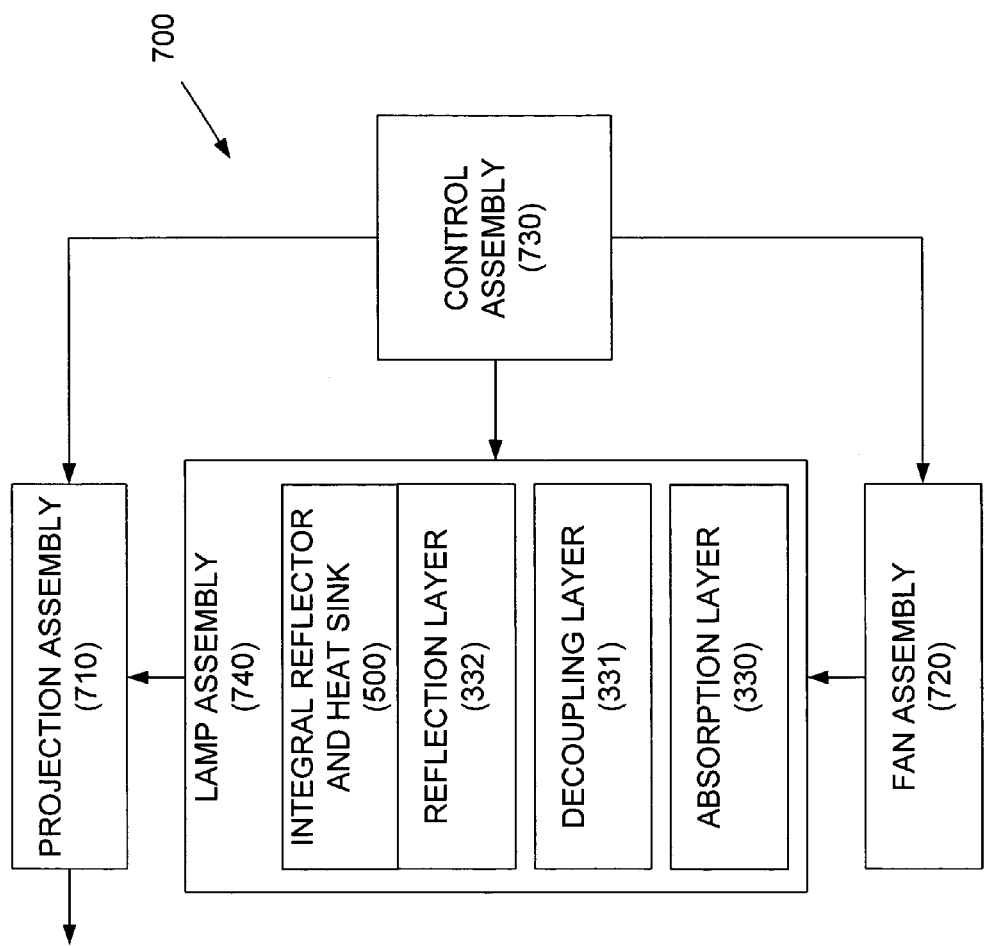
FIG. 7 is an exemplary block diagram of one embodiment of the invention.

FIG. 7 is a block diagram of an embodiment of a projection system 700 that incorporates at least one embodiment of the invention. The projection system 700 has a lamp assembly 740, a fan assembly 720, a projection assembly 710 and a control assembly 730. The control assembly 730 is used to adjust aspects of the projection assembly, to control the power to the lamp assembly 740, and to operate the fan assembly 720. The lamp assembly 740 includes an integral reflector and heat sink that has a plurality of optical coatings applied to the reflector surface to create a notched filter in the visible spectrum. These coatings include an absorption layer 330, an optional decoupling layer 331 and a reflection layer 332 to create a band-pass filter with a visible light notch filter for creating filtered light in the visible spectrum. Unwanted energy emitted from lamp in the lamp assembly 740 is transmitted through the reflection layer 332, the decoupling layer 331 (if present), and to the absorption layer 330. The heat generated by the absorption layer 330 is thermally coupled to the integral heat sink 500. The controller assembly 730 operates the fan assembly 720 when required to direct an airflow over the heat-sink to remove the unwanted heat into the ambient environment. The filtered light from the lamp assembly 740 is optically coupled to the projection assembly 710. Projection assembly 710 can incorporate one or more spatial light modulators controlled by the control assembly 730 to create viewable images or movies. Alternatively, the projection assembly can controlled for communication functions as well or in addition to creating images.

Figure 8:
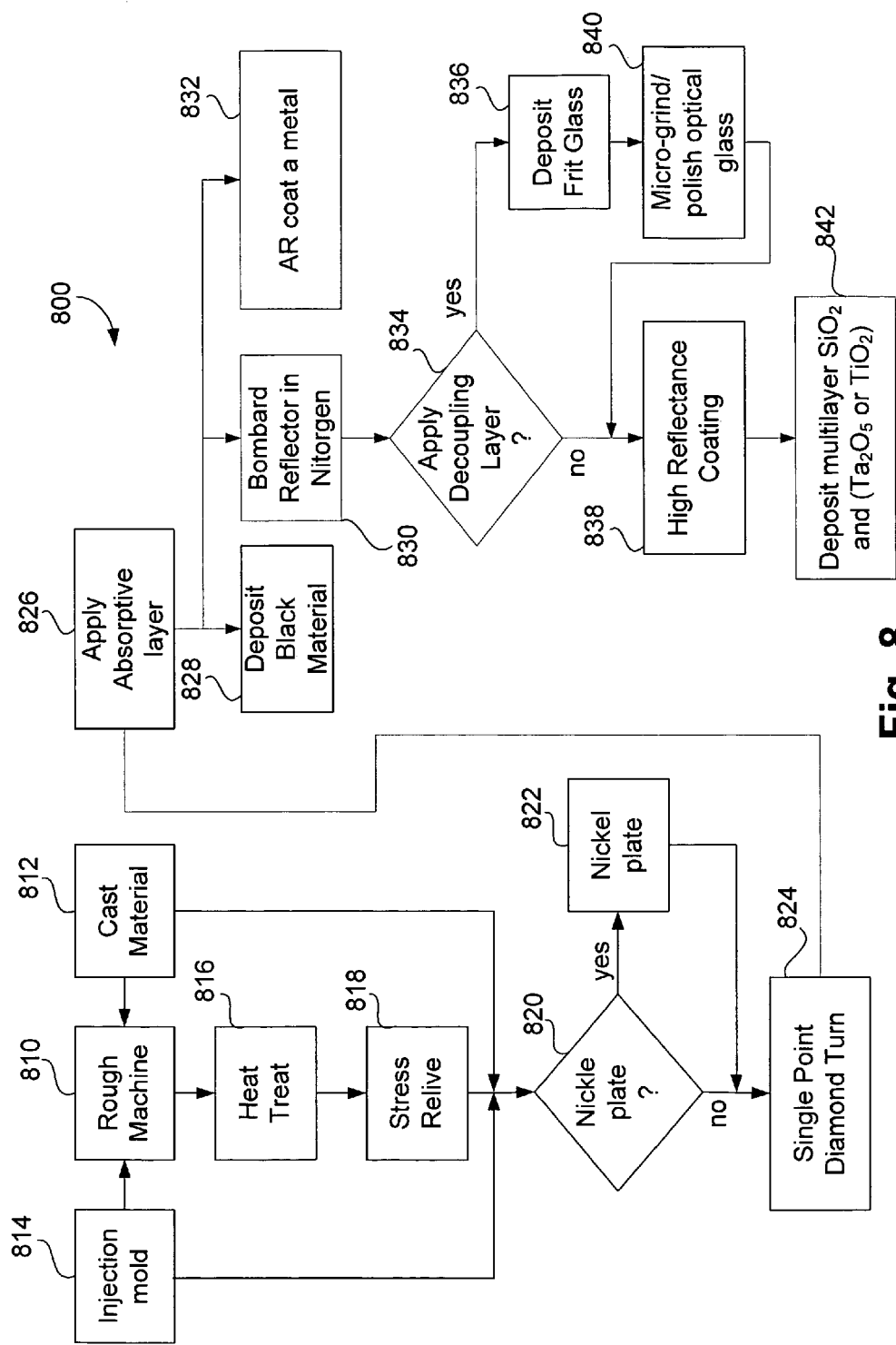
FIG. 8 is a block diagram illustrating exemplary manufacturing steps available to construct embodiments of the invention.

The integral reflector and heat-sink with the band-pass/notch filter coatings can be created by several different methods. For instance, FIG. 8 is a flow chart representing several different combinations of manufacturing steps 800 possible to create an integrated reflector alone or in combination with other optical elements. An aluminum alloy such as 6061, 7000, or 1000 series can be rough machined (block 810) to near the desired shape and then optionally heat treated (block 816) and/or optionally stress-relieved (block 818) to a known standard such as MIL H 6088. Other formation steps could be to injection mold the aluminum material (step 814) or to use a cast mold to form a cast material (step 812). The molded or cast part can then be further rough machined if the molds are not precise enough. Optionally, one could decide to nickel plate (block 820) the aluminum surface to harden it and if so plate the aluminum with nickel (block 820). Either way, the aluminum alloy part is then optionally single-point diamond turned (SPDT) to create an optical finish (block 824).

After the optical surface has been created, the absorptive layer is applied to the optical surface (step 826). Some of the possible methods include depositing black material (step 828), bombarding the aluminum in nitrogen (step 830), and depositing an anti-reflective coating such as dielectric phase matching layers (step 832). The black material can be chromium black or germanium directly deposited on the aluminum reflector. The dielectric phase matching layer can be a coating of $MgF_2$ on the aluminum surface with a thin film of chromium thereby creating a broadband black layer. If the aluminum is bombarded in nitrogen, aluminum nitride becomes embedded in the aluminum to create an aluminum black surface that can be directly coated with a high reflectance coating (step 838).

If desired (step 834) to prevent interaction between the reflective and absorptive layers or to form a polished optical surface that is well characterized, a decoupling layer can be deposited or otherwise applied on the absorptive layer. The decoupling layer is formed from a dielectric material that is transparent to the UV and I/R radiation to allow it to be coupled to the absorptive layer. One exemplary material is to deposit a Frit glass surface (step 836) which is may be micro grinded or polished (step 840) to create an optical glass surface. After the decoupling layer is deposited, a high reflectance coating, made of one or more layers, is applied thereon (step 838). One exemplary band-pass reflective surface with a notch filter for visible light is to have multiple layers of $SiO_2$ and Tantalum Oxide ($Ta_2O_5$) or Titanium Oxide ($TiO_2$) applied (step 842) (see FIG. 12 for one exemplary design).

Figure 9:
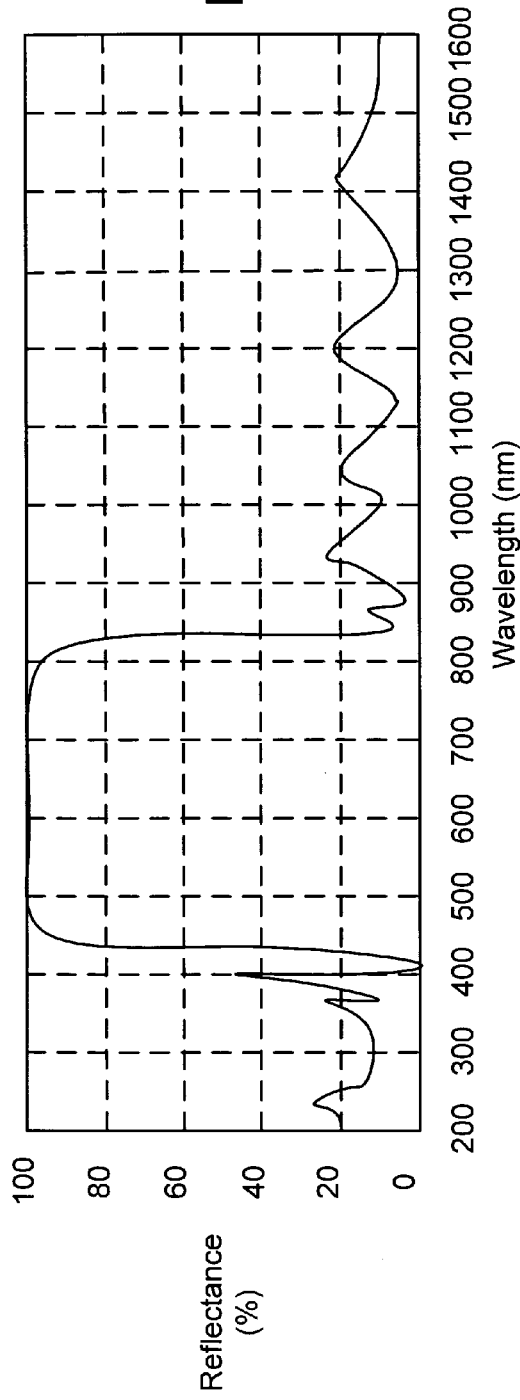
FIG. 9 is an exemplary spectral diagram of the reflector filter coatings on and embodiment of a reflector.

FIG. 9 is an exemplary graph of a band-pass filter that reflects light in the visible spectrum while passing most of the UV and I/R radiation through. FIG. 10 is an exemplary graph of how the band-pass filter transfer function can be modified to include a notch filter in the 560 nm to 600 nm wavelength spectrum to reduce the amount of light reflected from about 100% in FIG. 9 to about 60% reflection in FIG. 10. This addition of the notch filter is done by adjusting the relative thicknesses of the different dielectric coatings applied to the optical surface to create the reflective surface. Most of the UV and I/R non-reflectance is preserved. If further attenuation of the undesired peak is wanted, the design of the notch filter can be adjusted to decrease the amount of reflectance in the notch such as down to 20% of reflectance as shown in FIG. 11. An exemplary listing of the dielectric layer stack to achieve the notched filtering of FIG. 11 is shown in the table in FIG. 12. Modifications to the notch filter parameters such as changing the reflectance percentage or adjusting the wavelength of the peak to adapt to a particular light source can be made by those with skill in the art. For instance, the first blue peak 15 could be reduced to further fine tune the gamut.

The exemplary embodiments discussed herein include particular filters which may improve the gamut of a particular light source. Persons of skill in the art will recognize that the general principles are applicable to other light sources and that the light sources discussed herein could be used with filters which remove energy in spectral ranges other than those discussed herein which improve gamut. Different filters and different filter combinations could be used with a given light source to achieve different desired gamut for various applications.

Projectors suitable for use with filters of this disclosure may include any display devices such as near-to-eye display, digital projectors, rear projection televisions, computer monitors, advertising displays and other display devices that project modulated light onto a viewing surface and may include digital projectors.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A reflector for a light source having an unwanted wavelength peak within adjacent neighboring wavelengths, comprising:
   a body defining an optical surface; and
   a reflective surface disposed on the optical surface including a stack of dielectric layers defining at least one notch filter having a center wavelength at the unwanted wavelength peak and a bandwidth on each side of the center wavelength of about 20 nm that reflects only a portion of less than or equal to about 60% of the unwanted wavelength peak from the light source, the remaining portion of the unwanted wavelength peak at the center wavelength substantially equal to the adjacent neighboring wavelengths of the light source outside the notch filter.

2. The reflector of claim 1 further comprising an absorptive surface disposed on the optical surface beneath the reflective surface.

3. The reflector of claim 1 wherein the reflector is configured to mount the light source.

4. The reflector of claim 3 wherein the light source is a mercury-arc bulb.

5. The reflector of claim 1 wherein the reflector is a spatial homogenizer constructed as a hollow rectangular box configured to create a spatially uniform intensity across a rectangular transverse cross-section profile focused on a correspondingly ratioed rectangular shaped spatial light modulator.

6. The reflector of claim 1 wherein the reflector is a concave mirror.

7. The reflector of claim 6 wherein the reflector has an elliptical surface.

8. The reflector of claim 6 wherein the reflector has a parabolic surface.

9. The reflector of claim 1 wherein the stack of dielectric layers are formed of multiple layers of $Ta_2O_5$ and $SiO_2$.

10. The reflector of claim 1 wherein the stack of dielectric layers is configured to transmit a significant percentage of light striking it in the wavelengths of 560-600 nm to an absorptive surface.

11. The reflector of claim 10 wherein the significant percentage of transmitted light is greater than 40%.

12. A projection system, comprising:
a light source providing a set of electromagnetic emissions having an unwanted wavelength peak within adjacent neighboring wavelengths; and
a reflector having a filter coating with a notch defining a portion of the visible light spectrum corresponding to the unwanted wavelength peak and a bandwidth on each side of the center wavelength of about 20 nm in the electromagnetic emissions, the notch configured to reflect only a portion of less than or equal to about 60% of the unwanted wavelength peak from the light source, the remaining portion of the unwanted wavelength peak at the center wavelength substantially equal to the adjacent neighboring wavelengths of the light source outside the notch.

13. The projection system of claim 12 wherein electromagnetic emissions in the wavelength range of about 560 nm to about 600 nm is reduced by the notch in the filter coating.

14. The projection system of claim 13, further comprising a color wheel wherein the red segment is configured to pass electromagnetic emissions from the about 560 nm to about 600 nm wavelengths.

15. A method of increasing gamut in a projector, comprising:
providing a light source disposed in a reflector cavity having a peak output at an unwanted wavelength peak within adjacent neighboring wavelengths;
providing a stack of dielectric layers disposed on the reflector cavity defining a notch filter having a center wavelength at the unwanted wavelength peak and a bandwidth on each side of the center wavelength of about 20 nm that reflects only a portion of less than or equal to about 60% of the unwanted wavelength peak from the light source, the remaining portion of the unwanted wavelength peak at the center wavelength substantially equal to the adjacent neighboring wavelengths of the light source outside the notch filter; and
providing a color wheel with a color segment configured to pass the portion of the unwanted wavelength peak that is reflected by the notch filter.

16. The method of claim 15 further comprising providing an absorptive surface beneath the stack of dielectric layers to absorb the wavelengths from the light source not reflected by the stack of dielectric layers.

17. The method of claim 16 wherein the wavelengths absorbed include ultraviolet and infra-red wavelengths.

18. A method of boosting the light output of a light source within a projector system, comprising:
providing a light source disposed in a reflector cavity having a peak output at about 565 nm defining a center wavelength amongst adjacent neighboring wavelengths;
providing a reflective surface defining a notch filter at the center wavelength and a bandwidth on each side of the center wavelength of about 20 nm that reflects only a portion of less than or equal to about 60% of the about 565_nm peak output, the remaining portion at the center wavelength substantially equal to the adjacent neighboring frequencies of the light source outside the notch filter; and
providing a color wheel with a red segment configured to pass light from the light source in the wavelengths of about 560 nm to about 600 nm.

19. A method of improving gamut in a projector, comprising:
notch filtering a light source before it reaches a color wheel, the notch filtering defining a center wavelength and a bandwidth on each side of the center wavelength of about 20 nm within a yellow light band amongst adjacent neighboring wavelengths to reduce by less than or equal to about 60% an unwanted spike emitted by the light source at a center wavelength to the level of adjacent neighboring wavelengths; and
adjusting the filters of the color wheel to allow light within the notch filter wavelengths to pass through the red segment of the color wheel.

20. A projector, comprising:
a light source having a arc-lamp capable of providing a spectrum of visible light having at least one peak at an undesired wavelength within adjacent neighboring wavelengths; and
a reflector assembly configured to hold the light source, the reflector assembly having a reflective surface having a notch filter having a center wavelength at the unwanted wavelength peak and a bandwidth on each side of the center wavelength of about 20 nm in the undesired wavelength to reduce by less than or equal to about 60% the peak at the center wavelength to an intensity level substantially the same as the immediately neighboring wavelengths outside the notch filter.

21. The projector of claim 20 further comprising an absorptive surface disposed on the reflector assembly beneath the notch filter to absorb unwanted energy from the light source.

22. The projector of claim 20 further comprising a color wheel having a color segment configured to pass light reflected from the reflector assembly within the wavelength band immediately surrounding and including the undesired wavelength.

23. The projector of claim 20 wherein the light source is a mercury-arc light bulb.

24. The projector of claim 20 wherein the undesired wavelength is within the range of about 560 nm to about 600 nm.

25. The projector of claim 20 wherein the notch filter is comprised of a stack of dielectric layers formed by multiple layers of $Ta_2O_5$ and $SiO_2$.

26. A reflector assembly, comprising:
means for emitting light, including a peak at an undesired wavelength; and
means for reflecting the emitted light including means for reducing the peak to levels of the immediate wavelengths surrounding the undesired wavelength.

27. The reflector assembly of claim 26 further comprising means for absorbing the peak of emitted light not reflected by the means for reflecting.

28. The reflector assembly of claim 26 further comprising means for absorbing light from the means for emitting light that is in at least one of the ultraviolet or infra-red wavelengths.

* * * * *

UNITED STATES PATENT AND TRADEMARK OFFICE
CERTIFICATE OF CORRECTION

| | |
|---|---|
| PATENT NO. | : 7,306,342 B2 |
| APPLICATION NO. | : 11/074490 |
| DATED | : December 11, 2007 |
| INVENTOR(S) | : Angus Wu et al. |

It is certified that error appears in the above-identified patent and that said Letters Patent is hereby corrected as shown below:

In column 5, line 3, delete "mm" and insert -- nm --, therefor.

In column 10, line 1, delete "V" and insert -- UV --, therefor.

In column 14, line 1, in Claim 18, delete "565_nm" and insert -- 565 nm --, therefor.

Signed and Sealed this

First Day of July, 2008

JON W. DUDAS
*Director of the United States Patent and Trademark Office*